US00RE51119E

(19) United States
(12) Reissued Patent
Bordes et al.

(10) Patent Number: US RE51,119 E
(45) Date of Reissued Patent: Nov. 10, 2026

(54) METHOD AND A DEVICE FOR PICTURE ENCODING AND DECODING

(71) Applicant: INTERDIGITAL VC HOLDINGS, INC., Wilmington, DE (US)

(72) Inventors: Philippe Bordes, Laille (FR); Fabien Racape, San Francisco, CA (US); Ya Chen, Rennes (FR)

(73) Assignee: InterDigital VC Holdings, Inc., Wilmington, DE (US)

(21) Appl. No.: 18/416,053

(22) Filed: Jan. 18, 2024

Related U.S. Patent Documents

Reissue of:
(64) Patent No.: 11,228,757
Issued: Jan. 18, 2022
Appl. No.: 16/618,564
PCT Filed: May 17, 2018
PCT No.: PCT/EP2018/062882
§ 371 (c)(1),
(2) Date: Dec. 2, 2019
PCT Pub. No.: WO2018/219664
PCT Pub. Date: Dec. 6, 2018

(30) Foreign Application Priority Data

May 31, 2017 (EP) ..... 17305627
Mar. 30, 2018 (EP) ..... 18305386

(51) Int. Cl.
*H04N 19/117* (2014.01)
*H04N 19/147* (2014.01)
(Continued)

(52) U.S. Cl.
CPC ..... *H04N 19/117* (2014.11); *H04N 19/147* (2014.11); *H04N 19/176* (2014.11); *H04N 19/70* (2014.11)

(58) Field of Classification Search
None
See application file for complete search history.

(56) References Cited

U.S. PATENT DOCUMENTS

2013/0259118 A1* 10/2013 Fu ..... H04N 19/169 375/240.02
2014/0254661 A1* 9/2014 Saxena ..... H04N 19/625 375/240.2

(Continued)

*Primary Examiner* — John M Hotaling, II
(74) *Attorney, Agent, or Firm* — Condo Roccia Koptiw LLP

(57) ABSTRACT

An encoding method for encoding blocks of a picture part is disclosed in an embodiment. A reconstructed version of each block of the picture part, called reconstructed block, is determined. A plurality of candidate sets of filter parameters is obtained and an index is determined for each block of the picture part that identifies one of the candidate sets of filter parameters to be used for filtering the block. Each reconstructed block is filtered with the candidate set of filter parameters of the plurality of candidate sets of filter parameters identified by the index. The plurality of candidate sets of filter parameters, the blocks of the picture part and the index for each block are encoded in a bitstream. Advantageously, a plurality of candidate sets of filter parameters are determined such as to minimize a rate-distortion cost for each block of the picture part. For each block of the picture part, an index is determined that identifies one of the plurality of candidate sets of filter parameters to be used for filtering the block such as to minimize a rate-distortion cost for the block. The filter parameters of each candidate set of the plurality of candidate sets are refined using the reconstructed version of the blocks whose index identifies the candidate set.

21 Claims, 8 Drawing Sheets

(51) Int. Cl.
*H04N 19/176* (2014.01)
*H04N 19/70* (2014.01)

(56) References Cited

U.S. PATENT DOCUMENTS

| | | | | |
|---|---|---|---|---|
| 2016/0234492 | A1* | 8/2016 | Li | H04N 19/176 |
| 2017/0064302 | A1* | 3/2017 | Na | H04N 19/147 |
| 2018/0020218 | A1* | 1/2018 | Zhao | H04N 19/124 |
| 2018/0048901 | A1* | 2/2018 | Zhang | H04N 19/124 |

* cited by examiner

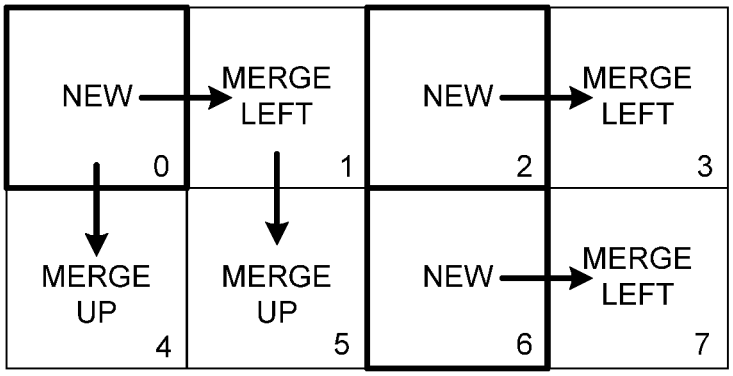
FIGURE 1 – Prior Art
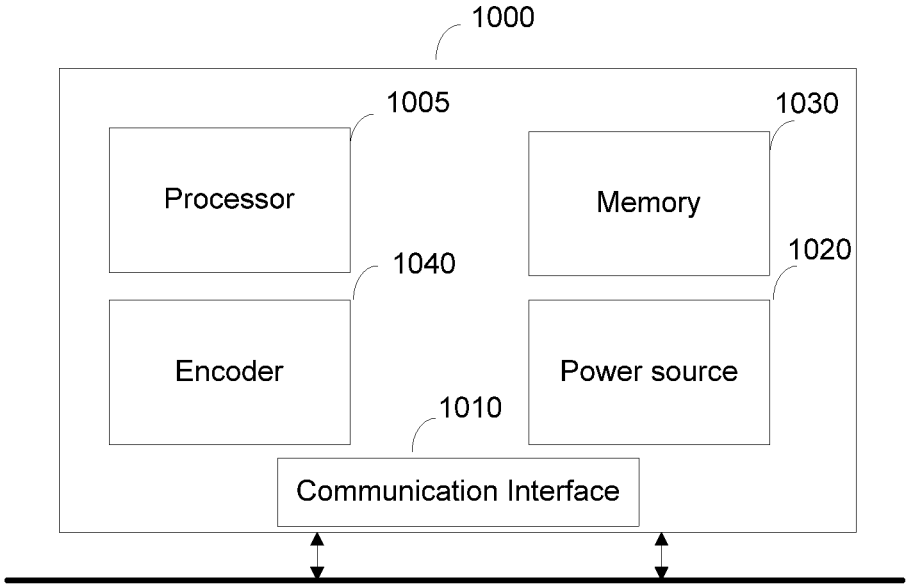
FIGURE 2

METHOD AND A DEVICE FOR PICTURE ENCODING AND DECODING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue application of U.S. Pat. No. 11,228,757, issued on Jan. 18, 2022, from U.S. Ser. No. 16/618,564, filed Dec. 2, 2019, which* claims the benefit, under 35 U.S.C. §[365] *371* of International Application PCT/EP2018/062882, filed May 17, 2018, which was published in accordance with PCT Article 21(2) on Dec. 6, 2018, in English, and which claims the benefit of European Patent Application No. 17305627.6 filed May 31, 2017 and European Patent Application No. 18305386.7 filed Mar. 30, 2018.

1. TECHNICAL FIELD

The present principles generally relate to a method and a device for encoding and decoding blocks of a picture part, and more particularly, to a method and a device for picture encoding and decoding with in-loop filtering, e.g. with sample adaptive offset filtering.

2. BACKGROUND ART

To achieve high compression efficiency, video coding schemes usually employ prediction and transform to leverage spatial and temporal redundancy in the video content. Generally, intra or inter prediction is used to exploit the intra or inter frame correlation, then the differences between group of samples in the original image and in the predicted image, often denoted as residuals, are transformed, quantized and entropy coded. To reconstruct the video, the compressed data is decoded by inverse processes corresponding to the prediction, transform, quantization and entropy coding.

Traditional video coding scheme includes in-loop filtering processes for improving the quality of the reconstructed images. In-loop filtering may comprise several filtering processes such as Deblocking Filtering (DF), Sample Adaptive Offset (SAO) filtering as in HEVC, and/or Adaptive Loop Filtering ALF such as Wiener filters. These filters may be applied successively in this order or in a different order. The Sample Adaptive Offset filtering process is described in section 8.7.3 of the document ITU-T H.265 entitled "High Efficiency Video Coding" (version of April 2015). The SAO filtering comprises adding offsets to some reconstructed samples in order to reduce coding artifacts, e.g. ringing or banding artifact. Two types of filtering may be performed when the SAO filtering is enabled (or activated): Edge Offset (EO) type or Band Offset (BO) type. The SAO filtering reduces sample distortion by first classifying the samples of one CTB (Coding Tree Block) into multiple categories and adding a specific offset to each sample depending on its category. Sets of SAO parameters (a set of SAO parameters comprising for example offsets, possibly offsets signs, filter type, etc) for each color component are thus determined on the encoder side and encoded at a CTU (Coding Tree Unit) level after other syntax elements of the CTU. In order to save bandwidth SAO parameters are not necessarily encoded for each CTU. A CTU may thus inherit its SAO parameters from a neighboring CTU. This decoding mode of SAO parameters is known as the merge mode. More precisely, in HEVC, a CTU may inherit its SAO parameters from a CTU located just above it (merge up) or just to the left (merge left) as depicted on FIG. 1. On this figure, a set of SAO parameters is effectively encoded for CTU 0, 2 and 6. The other CTUs inherit their SAO parameters. As an example, CTUs 1, 4 and 5 inherit their SAO parameters from CTU 0, CTU 3 inherits its SAO parameters from CTU 2 and CTU 7 inherits its SAO parameters from CTU 6.

Because the CTUs are encoded/decoded in a raster scan order, the choice of candidate sets of SAO parameters for merging is limited. As an example, CTU 3 can only inherit its SAO parameters from CTU 2, and CTUs 1, 4, 5 can only inherit their SAO parameters from CTU 0. CTU 7 may inherit its SAO parameters directly from CTU 6 (merge left) or indirectly (i.e. via CTU 3, merge up) from CTU 2. This method is thus inefficient since most of the CTUs of FIG. 1 may only inherit their SAO parameters from a single CTU while 3 sets of SAO parameter were encoded in the bitstream (namely one set of SAO parameters per CTU 0, 2 and 6).

3. BRIEF SUMMARY

An encoding method for encoding blocks of a picture part is disclosed that comprises:

- determining a reconstructed version of each block of the picture part, called reconstructed block;
- obtaining a plurality of candidate sets of filter parameters and determining an index for each block of the picture part identifying one of the candidate sets of filter parameters to be used for filtering the block;
- filtering each reconstructed block with the candidate set of filter parameters of the plurality of candidate sets of filter parameters identified by the index; and
- encoding in a bitstream the plurality of candidate sets of filter parameters, the blocks of the picture part and the index for each block;

wherein obtaining a plurality of candidate sets of filter parameters and determining an index for each block comprises:

- determining a plurality of candidate sets of filter parameters such as to minimize a rate-distortion cost for each block of the picture part;
- determining for each block of the picture part an index identifying one of the plurality of candidate sets of filter parameters to be used for filtering the block such as to minimize a rate-distortion cost for the block;
- refining the filter parameters of each candidate set of the plurality of candidate sets using the reconstructed version of the blocks whose index identifies the candidate set.

Advantageously, a candidate set of filter parameters is determined independently for each block of the picture part.

In a specific embodiment, the method further comprises selecting two candidate sets in the plurality of candidate sets and merging the two candidate sets into a single candidate set in the case where rate-distortion cost is decreased for the picture part by merging the two candidate sets into a single candidate set.

In another specific embodiment, the method further comprises selecting one candidate set in the plurality of candidate sets and removing the selected candidate set from the plurality of candidate sets in the case where rate-distortion cost is decreased for the picture part by removing the selected candidate set.

An encoder configured to encode blocks of a picture part is also disclosed, the encoder comprising:

means for determining a reconstructed version of each block of the picture part, called reconstructed block;

means for obtaining a plurality of candidate sets of filter parameters and for determining an index for each block of the picture part identifying one of the candidate sets of filter parameters to be used for filtering the block;

means for filtering each reconstructed block with the candidate set of filter parameters of the plurality of candidate sets of filter parameters identified by the index; and means for encoding in a bitstream the plurality of candidate sets of filter parameters, the blocks of the picture part and the index for each block, wherein the means for obtaining a plurality of candidate sets of filter parameters and for determining an index for each block are configured to:

determine a plurality of candidate sets of filter parameters such as to minimize a rate-distortion cost for each block of the picture part;

determine for each block of the picture part an index identifying one of the plurality of candidate sets of filter parameters to be used for filtering the block such as to minimize a rate-distortion cost for the block; and refine the filter parameters of each candidate set of the plurality of candidate sets using the reconstructed version of the blocks whose index identifies the candidate set.

In a variant, an encoding device is disclosed that comprises a communication interface configured to access a picture part and at least one processor configured to:

determine a reconstructed version of each block of the picture part, called reconstructed block;

obtain a plurality of candidate sets of filter parameters and determining an index for each block of the picture part identifying one of the candidate sets of filter parameters to be used for filtering the block;

filter each reconstructed block with the candidate set of filter parameters of the plurality of candidate sets of filter parameters identified by the index; and encode in a bitstream the plurality of candidate sets of filter parameters, the blocks of the picture part and the index for each block;

wherein to obtain a plurality of candidate sets of filter parameters and to determine an index for each block comprises:

to determine a plurality of candidate sets of filter parameters such as to minimize a rate-distortion cost for each block of the picture part;

to determine for each block of the picture part an index identifying one of the plurality of candidate sets of filter parameters to be used for filtering the block such as to minimize a rate-distortion cost for the block;

to refine the filter parameters of each candidate set of the plurality of candidate sets using the reconstructed version of the blocks whose index identifies the candidate set.

Advantageously, to determine a plurality of candidate sets of filter parameters comprises to determine a candidate set of filter parameters independently for each block of the picture part.

In a specific embodiment, the means for obtaining a plurality of candidate sets of filter parameters or the at least one processor are further configured to select two candidate sets in the plurality of candidate sets and merging the two candidate sets into a single candidate set in the case where rate-distortion cost is decreased for the picture part by merging the two candidate sets into a single candidate set.

In another specific embodiment, the means for obtaining a plurality of candidate sets of filter parameters or the at least one processor are further configured to select one candidate set in the plurality of candidate sets and removing the selected candidate set from the plurality of candidate sets in the case where rate-distortion cost is decreased for the picture part by removing the selected candidate set.

4. BRIEF SUMMARY OF THE DRAWINGS

FIG. 1 depicts CTUs inheriting their SAO parameters from neighboring CTUs located above or to the left according to the prior art;

FIG. 2 represents an exemplary architecture of a transmitter configured to encode a picture in a bitstream according to a specific and non-limiting embodiment;

5. DETAILED DESCRIPTION

Figure 3:
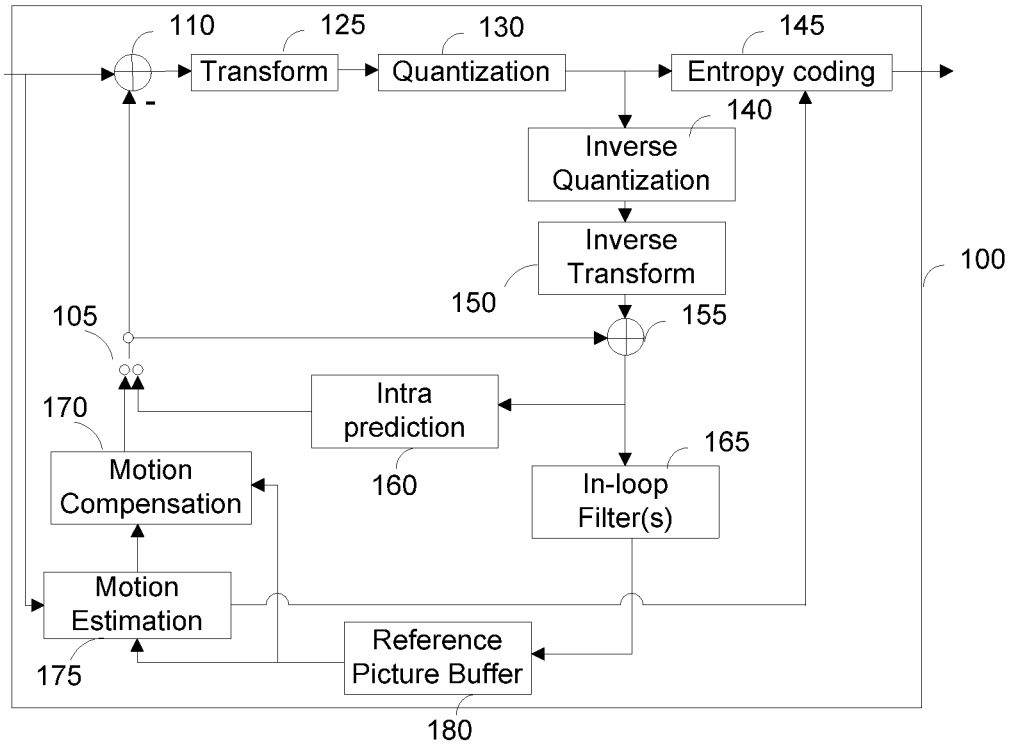
FIG. 3 illustrates an exemplary video encoder adapted to execute the encoding method according to the present principles.

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

A picture is an array of luma samples in monochrome format or an array of luma samples and two corresponding arrays of chroma samples in 4:2:0, 4:2:2, and 4:4:4 colour format or more generally an array of three color components such as Green, Red, Blue. Generally, a "block" addresses a specific area in a sample array (e.g., luma Y), and a "unit" includes the collocated block of all color components (luma Y and possibly chroma Cb and chroma Cr for example). A slice is an integer number of basic coding units such as HEVC coding tree units or H.264 macroblock units. A slice may consist of a complete picture as well as part thereof. Each slice may include one or more slice segments.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of blocks of a picture part, e.g. blocks of a slice. They may be applied to encode/decode a whole picture or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

FIG. 2 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIG. 6. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown).

According to exemplary and non-limiting embodiments, the transmitter 1000 can be, but is not limited to:

- a mobile device;
- a communication device;
- a game device;
- a tablet (or tablet computer);
- a laptop;
- a still picture camera;
- a video camera;
- an encoding chip or encoding device/apparatus;
- a still picture server; and
- a video server (e.g. a broadcast server, a video-on-demand server or a web server).

Figure 6:
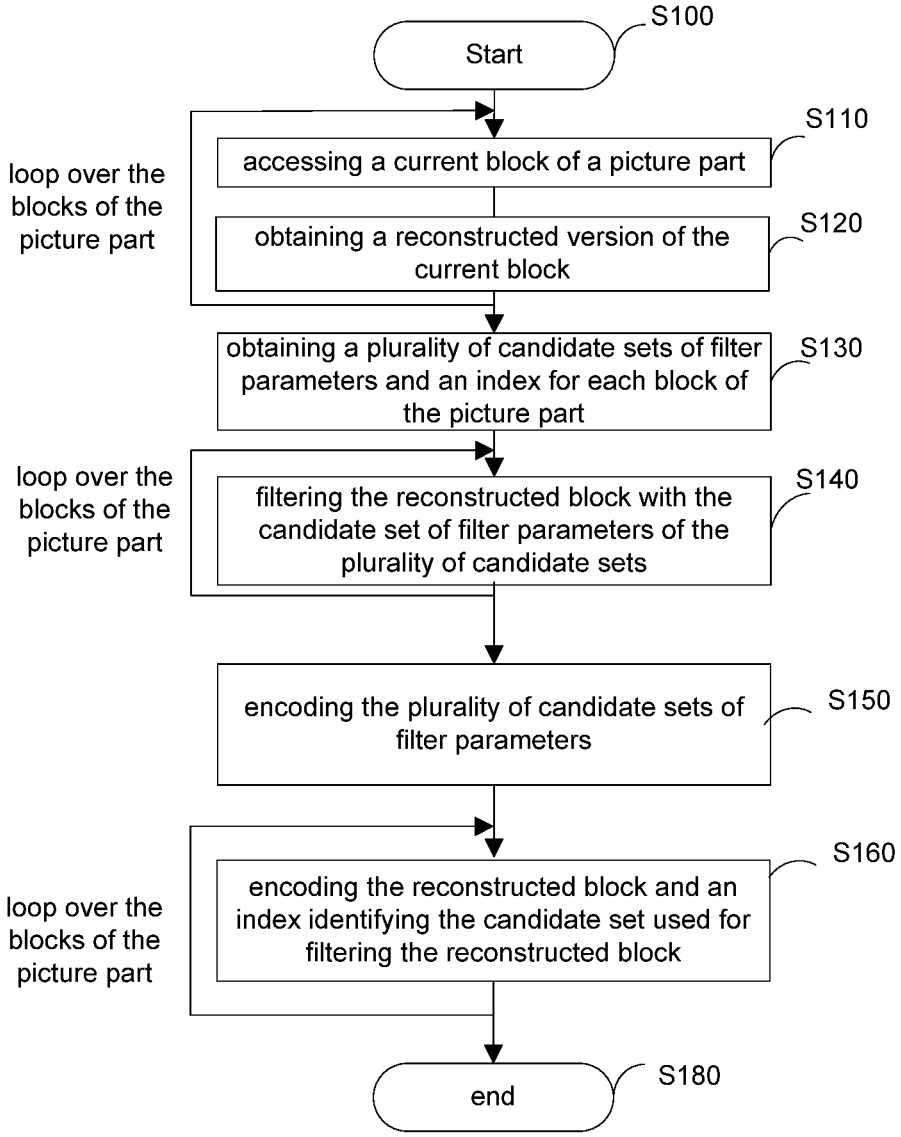
FIG. 6 represents a flowchart of a method for encoding blocks of a picture part in a bitstream according to a specific and non-limiting embodiment.

FIG. 3 illustrates an exemplary video encoder 100, e.g. a HEVC video encoder, adapted to execute the encoding method of FIG. 6. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest luma coding tree block (CTB) size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock, coding block) in other standards.

In HEVC, a CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed.

In HEVC, the precision of the motion information for motion compensation is one quarter-sample for the luma component and one eighth-sample for the chroma components. A 7-tap or 8-tap interpolation filter is used for interpolation of fractional-sample sample positions, i.e., ¼, ½ and ¾ of full sample locations in both horizontal and vertical directions can be addressed for luma.

The residuals are transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted sample block. An in-loop filter (165) is applied to the reconstructed picture, for example, to perform deblocking/SAO (Sample Adaptive Offset) filtering to reduce coding artifacts. The filtered picture may be stored in a reference picture buffer (180) and used as reference for other pictures.

In HEVC, SAO filtering may be activated or de-activated at video level, slice level and CTB level. Two SAO modes are specified: edge offset (EO) and band offset (BO). For EO, the sample classification is based on local directional structures in the picture to be filtered. For BO, the sample classification is based on sample values. The parameters for EO or BO may be explicitly coded or derived from the neighborhood (merge up or merge left). SAO can be applied to the luma and chroma components, where the SAO mode is the same for Cb and Cr components. The SAO parameters are configured individually for each color component. More precisely, a set of SAO parameters (i.e. the offsets, the SAO types EO, BO and inactivated, the class in case of EO and the band position in case of BO) is encoded at a CTU level.

In the case where SAO filtering is activated for a CTB, the samples in the CTB are categorized into NC categories, e.g. NC=5 in HEVC. For sample s in category c(s), the sample can be adjusted to s=s+off(c(s)), where off(n) is the offset value of category n. In HEVC, the offsets values of only 4 (=NC−1) categories are decoded from the bitstream, the other offset values being set to 0. For BO, absolute offset values and signs are decoded. For EO, only absolute offset values are decoded, the signs being inferred from the category (positive sign for categories 1 and 2, and negative sign for categories 3 and 4).

Edge Offset

Figure 4:
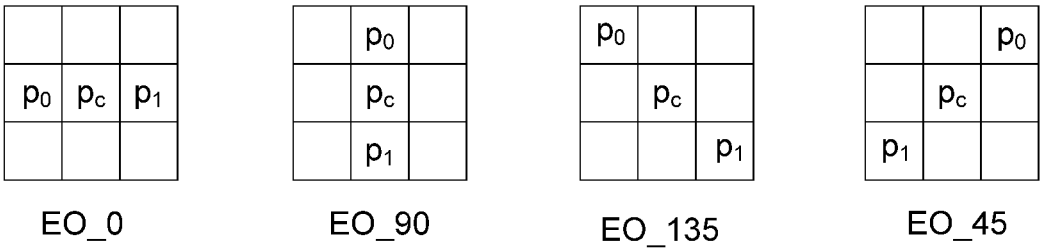
FIG. 4 is a pictorial example illustrating four 1-D directional patterns for EO (Edge Offset) sample classification according to the prior art.

EO uses four 1-D directional patterns for sample classification: horizontal, vertical, 135° diagonal, and 45° diagonal, as shown in FIG. 4 where the label "$p_c$" represents a current sample and the labels "$p_0$" and "$p_1$" represent two neighboring samples. Four EO classes are specified based on the directions, and each EO class corresponds to one direction. The selected EO class, only one for each CTB that enables EO, is signaled in the bitstream as side information.

TABLE 1

| Category | Condition |
|---|---|
| 1 | $p_c < p_0$ and $p_c < p_1$ |
| 2 | ($p_c < p_0$ and $p_c == p_1$) or ($p_c == p_0$ and $p_c < p_1$) |
| 3 | ($p_c > p_0$ and $p_c == p_1$) or ($p_c == p_0$ and $p_c > p_1$) |
| 4 | $p_c > p_0$ and $p_c > p_1$ |
| 0 | None of the above |

For a given EO class, each sample inside the CTB is classified into one of five (NC=5) categories based on local gradients. Specifically, the current sample value, labeled as "$p_c$," is compared with its two neighbors along the selected 1-D direction. The categorization rules for a sample are summarized in Table 1. Categories 1 and 4 are associated with a local valley and a local peak along the selected 1-D pattern, respectively, categories 2 and 3 are associated with concave and convex corners along the selected 1-D pattern, respectively. Positive offsets are used for categories 1 and 2, and negative offsets are used for categories 3 and 4.

If the current sample value does not belong to categories 1-4 (i.e., the current sample value is the same as its two neighbors, or if $p_0<p_c<p_1$ or $p_0>p_c>p_1$), then it is in category 0 and SAO is not applied (i.e., offset is 0). For categories 1-4, offsets are encoded. More precisely, the absolute values of four offsets are signaled by the encoder, one absolute value for each category. The signs of the offsets are not encoded but implicitly derived from the corresponding EO categories.

Band Offset

Figure 5:
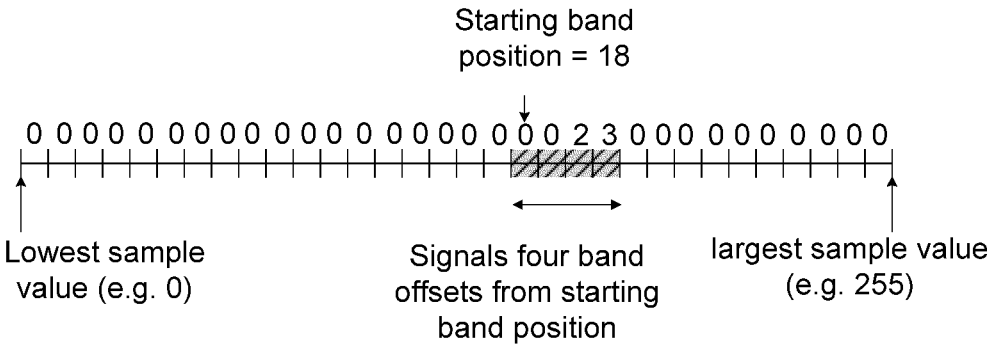
FIG. 5 is a pictorial example illustrating BO (Band Offset) with the associated starting band position and offsets of four consecutive bands according to the prior art.

For BO, the range of sample values (for example, 0-255 in 8-bit) is uniformly split into 32 bands. One offset is added to all samples whose value belong to the same band. In HEVC, only offsets of (NC−1)=4 consecutive bands and the starting band position are signaled to the decoder as illustrated on FIG. 5. On this figure, the starting band is the eighteenth band and the encoded offsets value are {0, 0, 2, 3}. The starting band position (i.e. an index) indicates the position of the first band with an encoded offset within the 32 bands. One offset is coded for each of the (NC−1) bands and the remaining bands have an offset equal to zero. When the starting band position is close to the last band position, the offset values may correspond to non-consecutive bands since the bands are managed as a circular buffer. Note for BO, those four signaled bands can be considered as four categories, and the remaining bands can be considered as another category. In the present application, we use the terms "band" and "category" interchangeably. For BO in HEVC, offsets are encoded for four bands. More precisely, the absolute values of four offsets are signaled by the encoder, one absolute value for each of the 4 bands. The signs of the offsets are also signaled by the encoder.

FIG. 6 represents a flowchart of a method for encoding blocks of a picture part in a bitstream according to a specific and non-limiting embodiment. The picture part may be the whole picture or a sub-part of it, e.g. a slice.

The method starts at step S100. At step S110, a transmitter 1000, e.g. such as the encoder 100, accesses a current block of a picture part.

At step S120, the transmitter determines a reconstructed version of the accessed block also named reconstructed block. Determining the reconstructed block usually but not necessarily comprises partial encoding (possibly without entropy coding) followed by decoding. Partial encoding comprises subtracting a predictor from the accessed block to obtain a block of residuals, transforming the block of residuals into a block of transform coefficients, quantizing the block of coefficients with a quantization step size to obtain a quantized block of transform coefficients. Decoding a block on the encoder side usually but not necessarily comprises de-quantizing and inverse transforming the quantized block of transform coefficients to obtain a block of residuals and adding the predictor to the block of residuals to obtain the reconstructed block. The method may loop steps S110 and S120 over all blocks of the picture part in order to obtain a reconstructed picture part composed of all reconstructed blocks before continuing to step S130.

At step S130, the transmitter obtains a plurality of candidate sets of filter parameters and further determines an index (merge_idx) for each block of the picture part that identifies one candidate set among the plurality of candidate sets to be used for filtering the block at step S140. A set of filter parameters comprises at least one filter parameter.

Figure 9:
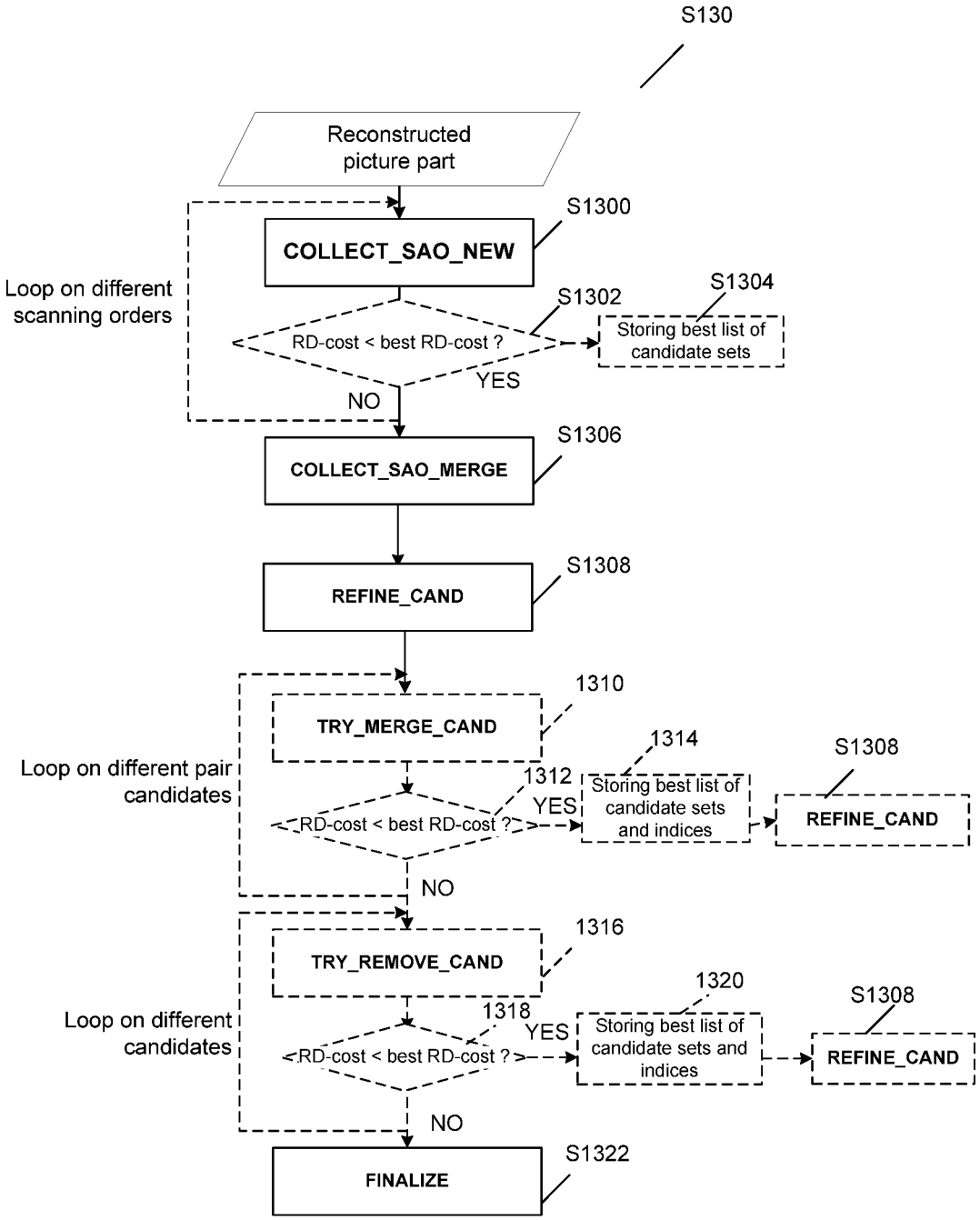
FIG. 9 represents a flowchart of a method for obtaining a plurality of candidate sets of filter parameters and for determining an index for each block of a picture part.

The plurality of candidate sets of filter parameters may be determined off-line and thus obtained from a memory. In a variant, the plurality of candidate sets of filter parameters are determined on the fly by Rate-Distortion Optimization known as RDO as illustrated by FIG. 9 from the content of the picture part. In this latter case, the different variants (e.g. re-ordering of the candidate sets in the list as disclosed for step S250 of FIG. 13) disclosed for the decoding method also apply when determining the coding rate. To this aim, the list of candidate sets resulting in the best rate-distortion trade-off is selected. In a particular embodiment, the list of candidate sets comprises a specific candidate set of filter parameters known as the OFF candidate set. As an example, the OFF candidate is put at a predefined position, e.g. the second position, in the list of candidate sets.

An index is also determined for each block of the picture part, the index identifying one candidate set among the plurality of candidate sets to be used for filtering the block. The index may also be determined by RDO. In case of re-ordering of the list of candidate sets, the determination of the index is done after the list re-ordering.

At step S140, the transmitter filters the reconstructed block with the candidate set of filter parameters identified by the index determined at step S130. In the case where the index merge_idx identifies the OFF candidate, the block is not filtered at step S140. In a specific embodiment, the filter is a SAO filter and the filtering steps disclosed with reference to FIG. 3 apply. The method may loop step S140 over all blocks of the picture part in order to filter all these blocks before continuing to step S150.

Figure 7:
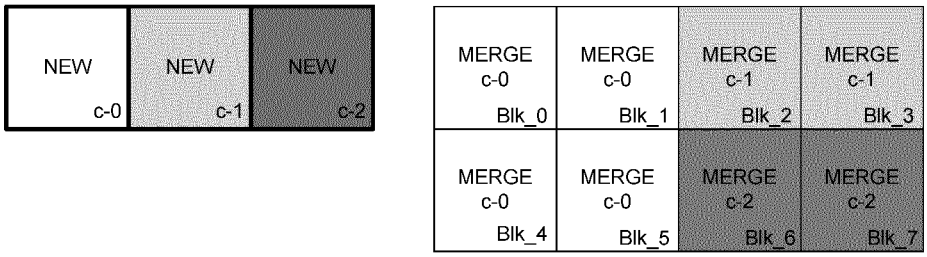
FIG. 7 is a pictorial example illustrating blocks of a picture part referring to a plurality of candidate sets of filter parameters according to the present principles.

At step S150, the transmitter encodes the plurality of candidate sets of filter parameters in the bitstream. With respect to FIG. 7, three candidate sets of filter parameters are encoded (c-0, c-1 and c-2). Each block of the picture part on the right side of FIG. 7 inherits its filter parameters from one of the three candidate sets. On FIG. 7, blocks Blk_0, Blk_1, Blk_4 and Blk_5 have the same filter parameters, i.e. the filter parameters of the candidate set c-0, the blocks Blk_2 and Blk_3 have the same filter parameters, i.e. the filter parameters of the candidate set c-1 and the blocks Blk_6 and Blk_7 have the same filter parameters, i.e. the filter parameters of the candidate set c-2. The OFF candidate if present in the list obtained at step S130 is not encoded in the bitstream but will be added in the list of candidate sets on the decoder side. In the FIG. 7, for clarity purpose, the candidate set used is referred by its number in the original candidate set list order. In case of re-ordering of the list, the value of coded index (merge_idx) may be different for two blocks, even if these two blocks use the same candidate set for filtering. Conversely, two blocks may have the same value of coded index which corresponds to two different candidate sets because of the re-ordering of the list before determining the value of the indices.

Advantageously, the plurality of candidate sets of filter parameters are encoded in a header of a slice. In a variant, the plurality of candidate sets of filter parameters are encoded at the level of the first block (e.g. Blk_0 on FIG. 7) of the picture part in the encoded order. As an example, on FIG. 8, the three candidate sets of filter parameters are encoded with the syntax elements of the first block, Blk_0.

In another embodiment, the transmitter encodes in the bitstream a data representative of a number of candidate sets of filter parameters. As an example, the encoded data num_sao_cand_minus1 is the number of candidate sets of filter parameters to be encoded minus one. Since the value of num_sao_cand_minus1 is necessarily inferior to the number of blocks in one picture part, e.g. in one slice, minus one, the number of bits representing the syntax element num_sao_cand_minus1 is inferior to log 2 (number of blocks in one picture part minus one).

An example of syntax of the HEVC type for SAO filtering is provided by tables 2 and 3. According to Table 2, once num_sao_cand_minus1 is encoded, each candidate set of SAO parameters is encoded. In the example of Table 2, a candidate set, here the OFF candidate, is inferred and thus not coded. In the case where no candidate is inferred, the syntax is modified as illustrated by Table 3. Table 4 illustrates the encoding of a candidate set of SAO parameters according to the present principles.

These SAO parameters are the following:

slice_sao_luma_flag (encoded in a slice header) equal to 1 specifies that SAO is enabled for the luma component in the current slice and SAO parameters for luma component are present; slice_sao_luma_flag equal to 0 specifies that SAO is disabled for the luma component in the current slice and SAO parameters for luma component are not present.

slice_sao_chroma_flag (encoded in a slice header) equal to 1 specifies that SAO is enabled for the chroma component in the current slice and SAO parameters for chroma component are present; slice_sao_chroma_flag equal to 0 specifies that SAO is disabled for the chroma component in the current slice and SAO parameters for chroma component are not present.

sao_type_idx_luma specifies the offsets type for the luma component.

sao_type_idx_chroma specifies the offsets type for the chroma components.

SaoTypeIdx[cIdx][idxCand] specifies the offset type (0 Not applied, Band offset or Edge Offset) for the candidate set idxCand for the colour component cIdx. As an example, a value 0 indicates that the SAO filtering is not applied, a value 1 indicates that the SAO filtering is applied with Band offset and a value 2 indicates that the SAO filtering is applied with Edge Offset. SaoTypeIdx[cIdx][idxCand] is derived from sao_type_idx_luma and sao_type_idx_chroma syntax elements. SaoTypeIdx[0][idxCand] is set equal to sao_type_idx_luma and SaoTypeIdx[cIdx][idxCand] is set equal to sao_type_idx_chroma for cIdx=1 or 2.

sao_offset_abs [cIdx][idxCand][i] specifies the offset value of i-th category for the candidate set idxCand for the colour component cIdx.

sao_offset_sign [cIdx][idxCand][i] specifies the sign of the offset value of i-th category for the candidate set idxCand for the colour component cIdx.

sao_band_position [cIdx][idxCand] specifies the value of the first band offset of the sample range when SaoTypeIdx [cIdx][idxCand] is equal to band offset.

sao_eo_class_luma specifies the edge offset class for the luma component.

sao_eo_class_chroma specifies the edge offset class for the chroma components.

TABLE 2

| read_sao_cand( ) { | Descriptor |
|---|---|
| num_sao_cand_minus1 | ae(v) |
| for( cIdx = 0; cIdx < 3; cIdx++ ) | |
| SaoTypeIdx[ cIdx ][ 0 ] = 0 | |
| for( idxCand = 1; idxCand < (num_sao_cand_minus1+1) ; idxCand++ ) | |
| sao_cand( idxCand ) | |
| } | |

TABLE 3

| read_sao_cand( ) { | Descriptor |
|---|---|
| num_sao_cand_minus1 | ae(v) |
| for( idxCand = 0; idxCand < (num_sao_cand_minus1+1) ; idxCand++ ) | |
| sao_cand( idxCand ) | |
| } | |

TABLE 4

| sao_cand( idxCand ) { | Descriptor |
|---|---|
| for( cIdx = 0; cIdx < 3; cIdx++ ) | |
| if( ( slice_sao_luma_flag && cIdx = = 0 ) \| \| | |
| ( slice_sao_chroma_flag && cIdx > 0 ) ) { | |
| if( cIdx = = 0 ) | |
| sao_type_idx_luma | ae(v) |
| else if( cIdx = = 1 ) | |
| sao_type_idx_chroma | ae(v) |
| if( SaoTypeIdx[ cIdx ][ idxCand ] != 0 ) { | |
| for( i = 0; i < 4; i++ ) | |
| sao_offset_abs[ cIdx ][ idxCand ][ i ] | ae(v) |
| if( SaoTypeIdx[ cIdx ][ idxCand ] = = 1 ) { | |
| for( i = 0; i < 4; i++ ) | |
| if( sao_offset_abs[ cIdx ][ idxCand ][ i ] != 0 ) | |
| sao_offset_sign[ cIdx ][ idxCand ][ i ] | ae(v) |
| sao_band_position[ cIdx ][ idxCand ] | ae(v) |
| } else { | |
| if( cIdx = = 0 ) | |
| sao_eo_class_luma | ae(v) |
| if( cIdx = = 1 ) | |
| sao_eo_class_chroma | ae(v) |
| } | |
| } | |
| } | |
| } | |

At step S160, the transmitter encodes, in the bitstream, the current block and the index (merge_idx) determined at step S130. Encoding here refers to entropy coding. Consequently, the current block, more precisely the transform coefficients obtained at step S120 with the coding parameters (e.g. coding modes, possibly motion vectors, etc), is entropy coded in the bitstream, e.g. using for example Context-adaptive binary arithmetic coding (CABAC) or Context-adaptive variable-length coding (CAVLC). The encoding of the index merge_idx for a block of coordinate (rx, ry) is illustrated by Table 5 in the case where the OFF candidate set is present in the list of candidate sets or by Table 6 in the case where the OFF candidate set is not present the list of candidate sets. The index is for example encoded using Truncated Rice (TR) binarization as specified in 9.3.3.2 of HEVC standard with cMax=idx_max. idx_max is determined in the same way as in the decoder side. idx_max represents the largest possible value of index for a given block.

Figure 8:
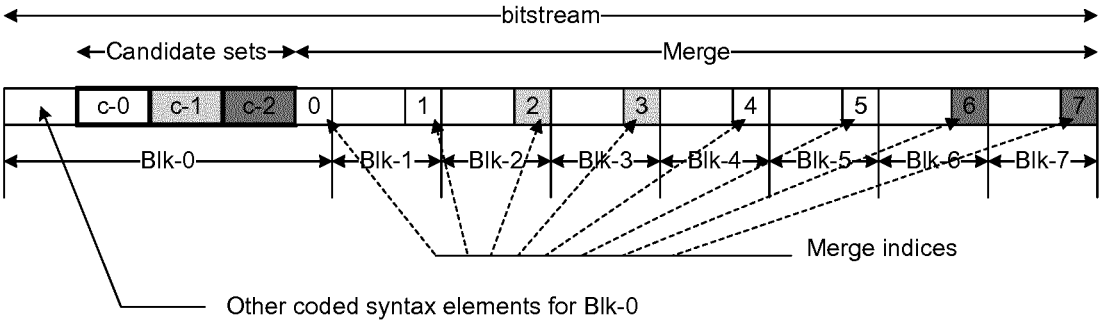
FIG. 8 is a pictorial example of a bitstream representative of blocks of a picture part according to the present principles, wherein a plurality of candidate sets of filter parameters is signaled with syntax elements associated with a first block.

With reference to FIG. 8, an index is encoded for each block (merge_idx). This index identifies one of the candidate sets of filter parameters. In an embodiment, all the blocks are in merge mode, i.e. all blocks inherit their filter parameters from one of the candidate sets of filter parameters. This makes it possible to save some bits since there is no more need to encode for a block a flag indicating whether the block is in merge mode or not, i.e. whether or not it inherits its filter parameters from neighbors or not. In particular, there is no more need to encode the following HEVC flags sao_merge_left_flag and sao_merge_up_flag which specify that SAO parameters are derived from corresponding SAO parameters of neighboring CTUs.

In the case where the OFF candidate set is not present in the list of candidate sets, the merge_idx may be inferred for the first block Blk_0 and thus not encoded (see if (rx==0 and ry==0) { } in Table 6).

TABLE 5

```
sao_merge( rx, ry ){                                                    Descriptor
  if ( rx == 0 && ry == 0 )
    idx_max = 1
  merge_idx                                                             ae(v)
  if ( merge_idx != 0 )
    idx_max = (idx_max< num_sao_cand_minus1?(idx_max+1):num_sao_cand_minus1
}
```

TABLE 6

```
sao_merge( rx, ry ){                                                    Descriptor
  if ( rx == 0 && ry == 0 ) {
    idx_max = 0
    merge_idx = 0
  }
  else {
    merge_idx                                                           ae(v)
    if ( merge_idx != 0 )
      idx_max = (idx_max< num_sao_cand_minus1?(idx_max+1):num_sao_cand_minus1
  }
}
```

The method may loop step S160 over all blocks of the picture part in order to encode all blocks of the picture part with their corresponding indices.

The method ends at step S180.

The present principles may be applied to SAO filter but are not restricted to this type of filters and may be applied to other filter for which a set of at least one filter parameter has to be defined at the block level.

FIG. 9 represents a flowchart of a method for obtaining a plurality of candidate sets of filter parameters and for determining an index for each block of the picture part identifying one candidate set to be used for filtering the block according to a specific and non-limiting embodiment.

At the beginning, the list of candidate sets of filter parameters is initialized, e.g. the list is either empty or comprises the OFF candidate only.

At step S1300, the transmitter determines filter parameters for each block of the picture part using RDO. To this aim, each block of the picture part has the choice of selecting a candidate set of filter parameters already in the current list of candidate sets (merge mode with encoding of an index merge_idx) or of defining a new candidate set of filter parameters (new mode with encoding of a new set of filter parameters) to be added to the current list of candidate sets. When new mode is selected, i.e. a new candidate set is defined, the RD-cost is based on a distortion reduction of the current block and on the coding rate of the filter parameters. When merge mode is selected, the RD-cost is based on the distortion reduction of the current block and on the coding rate of the index merge_idx. At the end of S1300, a list of candidate sets of filter parameters is obtained referred to as the best list of candidate sets.

Figure 10:
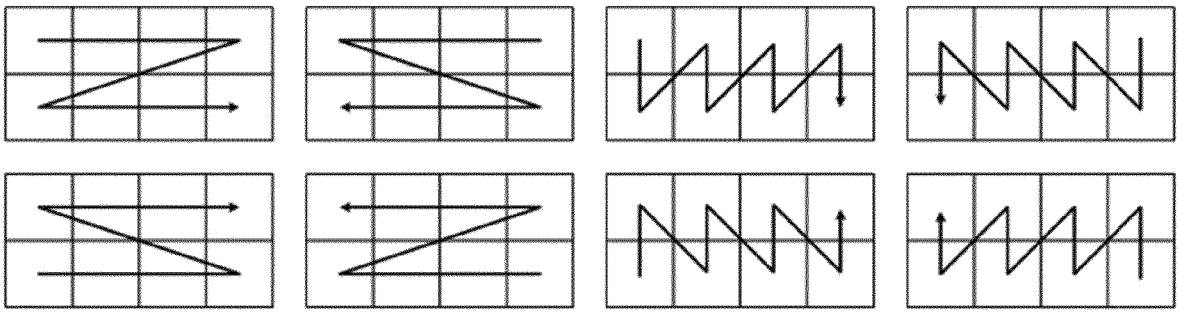
FIG. 10 is a pictorial example illustrating different scanning of blocks of a picture part.

In a variant embodiment, the blocks in the picture part may be scanned according to different scanning orders in order to determine a current list of candidate sets of filter parameters. FIG. 10 is a pictorial example illustrating different scanning of blocks of a picture part. In this case, a RD-cost is calculated on the picture part for a current scanning order and is compared at step S1302 with the best RD-cost obtained so far. If the RD-cost for the current scanning order is lower than the best RD-cost obtained so far, the current candidate sets is stored at step S1304 as the best list of candidate sets, otherwise the best list of candidate sets remains unchanged and the method continues until all scanning orders are tested. At the end of the loop over the scanning orders, a list of candidate sets of filter parameters, named best list of candidate sets, corresponding to the best RD-cost trade-off is thus obtained for a given scanning order. Finally, the best list of candidate sets is re-ordered in raster scan order in the case where the best list of candidate set was obtained for a scanning order that is different from the raster scan order.

In a specific and non-limiting embodiment, all blocks of the picture part are in mode new, i.e. the mode merge is disabled but only during the determination of the plurality of candidate sets, i.e. only during step S1300. In this case, a new candidate set of filter parameters is determined for each block of the picture part.

At step S1306, an index is determined for each block of the picture part by selecting an index offering a best RD-cost for this block in merge mode using the best list of candidate sets obtained at previous step. This index refers to one of the candidate sets of the best list of candidate sets. During step S1306, all blocks of the picture part are in merge mode. The indices obtained are stored and a RD-cost is computed on the picture part with the indices determined at step S1306. The value of best RD-cost is set to this computed RD-cost value. In this step, the best list of candidate sets remains unchanged.

At step S1308, the filter parameters of the candidate sets are refined (e.g. SAO type and offsets in case of SAO filtering) by RDO. To this aim, the filter parameters of a candidate set are refined based on a distortion reduction computed on all the blocks of the picture part using this candidate set for filtering. The region of the picture part using this candidate set comprise all the samples of the blocks that use this candidate set, i.e. whose merge_idx refers to this candidate set.

In a variant, after refinement of the candidate sets, new indices are determined for the blocks of the picture part by RDO using the refined candidate sets. This step is identical to step S1306.

At the end of step S1308, a RD-cost may be computed on the picture part with the refined candidate sets determined at step S1308 and possibly with the new indices. This RD-cost value is compared with the best RD-cost obtained so far. If the current RD-cost is lower than the best RD-cost obtained so far, the refined candidate sets and the new indices are stored for being used in the next steps, otherwise the best list of candidate sets remains unchanged and the indices obtained before step S1308 are kept as input for the next step.

At optional step 1310, two candidate sets of filter parameters C1 and C2 corresponding to regions R1 and R2 may be merged into a single candidate set if the sum of the corresponding RD-costs computed on each region (RDcost1+RDcost2) is larger than the RD-cost obtained when using a single candidate set whose filter parameters are determined on the region R composed of the union of R1 and R2. The region R1 comprises all the samples of the blocks in the picture part that use C1, i.e. whose merge_idx refers to C1, and R2 comprises all the samples of the blocks in the picture part that use C2, i.e. whose merge_idx refers to C2. The filter parameters of the single candidate set are determined based on a distortion reduction computed on all the blocks of both region R. When two candidate sets are merged, the indices of the blocks are updated. In theory, all pair of candidate sets may be tested for merging. In practice, the pair of candidate sets offering the largest RD-cost reduction is merged and the method may return to step S1308 for refining the filter parameters of the candidate sets. A RD-cost is calculated on the picture part and is compared at step S1312 with the best RD-cost obtained so far. If the RD-cost is lower than the best RD-cost obtained so far, the current candidate sets with the merged candidate sets and the updated indices are stored at step S1314 otherwise the best list of candidate sets and the indices remains unchanged and the method may continue with a new pair of candidate sets or may continue to step S1316.

At optional step S1316, we test the removal of one candidate set from the current list of candidate sets and we evaluate if RD-cost decreases or not. In case of removal of one candidate sets, the indices of the blocks are updated. The method may then go back to step S1308, in order to refine the filter parameters. A RD-cost is calculated on the picture part and is compared at step S1318 with the best RD-cost obtained so far. If RD-cost is higher than the best RD-cost obtained so far, the candidate set is not removed from the current list of candidate sets. In this case, the best list of candidate set and the indices remain unchanged. Otherwise, the current list of candidate sets obtained after removal of one candidate set and the updated indices are stored at step S1320. This may be done for all the candidate sets except the OFF candidate when it is inferred.

At step S1322, one decides to validate or not the filtering for the picture part based the RD-cost values obtained for each component individually. In previous steps S1300 to S1320, the RD-cost was computed taking into account all components, namely luma and chroma components. In step S1322, the RD-cost is computed individually for each component. If filtering the blocks of the picture part with filter parameters determined previously provides a decrease of the RD-cost for one component compared to not filtering the blocks, then the filtering is validated for the picture part and for this component. Otherwise, the filtering is not validated for this component. This decision is made per component (e.g. independently for luma and chroma). In the specific case of SAO filtering, the flags slice_sao_luma_flag/slice_sao_chroma_flag are enforced to true in the case where filtering is validated.

The list of candidates is re-ordered in the order of use.

In a specific and non-limiting embodiment, the steps S1306 to S1316 may be repeated iteratively until a stop condition is met. The stop conditions may be (but not limited to) that:

there is no more merging of candidate sets;

no candidate set can be removed anymore;

no more refinement is possible at step S1308; or the number of maximum iterative loops is reached;

The order of the steps may be arranged different. For example, one can perform S1316 before S1310, and/or S1308 before S1306. Some of the steps may be optional, such as S1310, and S1316.

In steps S1300, S1308, S1310 and S1316 filter parameters are determined for one block or for one region composed of several blocks. In the specific case of SAO filtering, the filter parameters may be determined as disclosed in the document from Fu et al entitled Sample Adaptive Offset for HEVC published in MMSP in 2011.

First, for each type t (BO, EO_0, EO_90, EO_45, EO_130) and each category-c in SAO type-t (band index for BO or half-peak, half-valley, full-peak, full-valley for EO), one collects the number of samples $Ar_{i,t,c}$ of the region-i in this category and the corresponding sum of difference $e_{i,t,c}$ between reconstructed signal and original signal. The corresponding offset is noted $a_{i,t,c}$ and can be estimated as follows:

$$a_{i,t,c} = \frac{e_{i,t,c}}{N_{i,t,c}}$$

The RD-cost is obtained using the following equation, where $\lambda$ is a Lagrangian multiplier, $D_{i,t,c}$ is a distortion reduction and $R_{i,t,c}$ is an estimated rate (number of bits used for coding) of the corresponding offsets:

$$J_{i,t,c}=D_{i,t,c}+\lambda \cdot R_{i,tx},$$

In the document Sample Adaptive Offset for HEVC, Fu shows that $D_{i,t,c}$ may be expressed as a function of $a_{i,t,c}$, $e_{i,t,c}$ and $N_{i,t,c}$ only. Consequently, the value of the offsets $a_{i,t,c}$ may be determined/refined in order to minimize the RD-cost $J_{i,t,c}$.

For the candidate sets, the SAO parameters are the values of type-t, the category-c and the offsets $a_{i,t,c}$ for the 3 components and $R_{i,t,c}$ is the (estimated) number of bits used for coding these data. The region-i is composed of the blocks that use this candidate set for filtering.

For the blocks coded in mode merge, $R_{i,t,c}$ is the (estimated) number of bits used for coding the index merge-idx. The region-i is the block.

To derive the overall RDcost, the distortion reduction is the sum of the distortion reductions of all the candidates and the rate is the sum of the candidate rates (coding of SAO parameters types and offsets) and the block rates (coding of merge indices).

Figure 11:
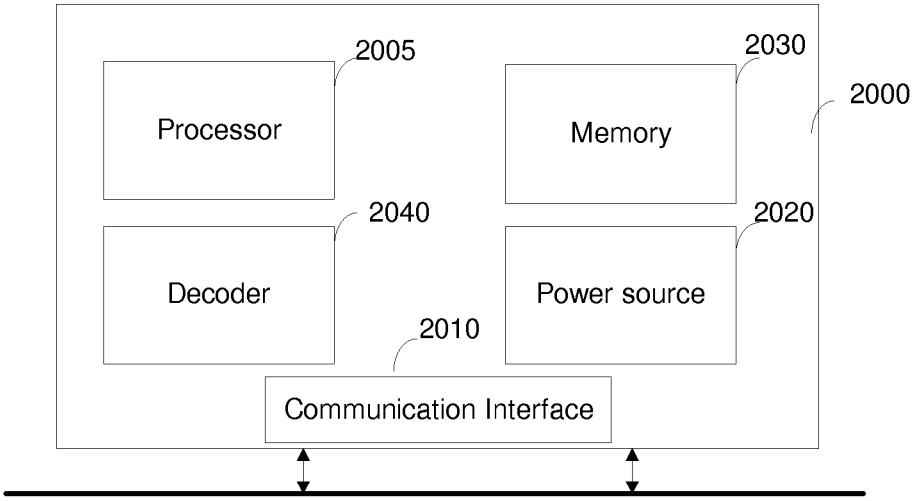
FIG. 11 represents an exemplary architecture of a receiver configured to decode a picture from a bitstream according to a specific and non-limiting embodiment.

FIG. 11 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIG. 13. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:

- a mobile device;
- a communication device;
- a game device;
- a set top box;
- a TV set;
- a tablet (or tablet computer);
- a laptop;
- a video player, e.g. a Blu-ray player, a DVD player;
- a display; and
- a decoding chip or decoding device/apparatus.

Figure 12:
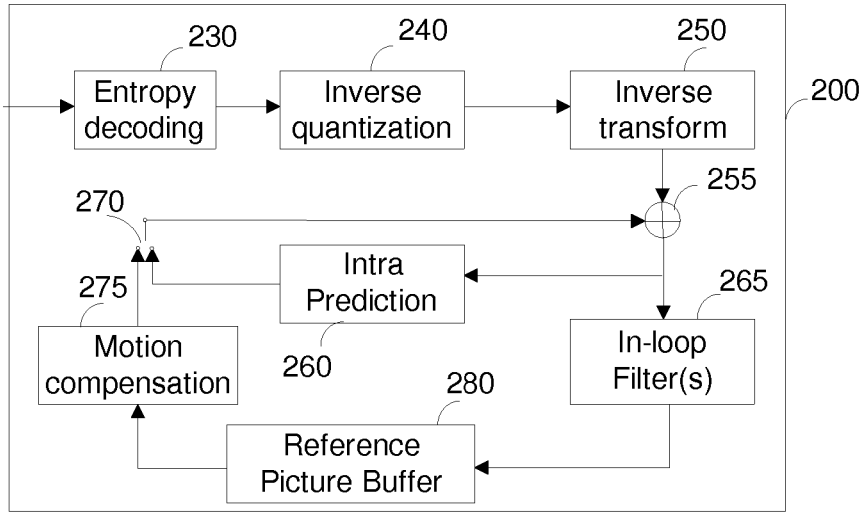
FIG. 12 illustrates an exemplary video decoder adapted to execute the decoding method according to the present principles.
Figure 13:
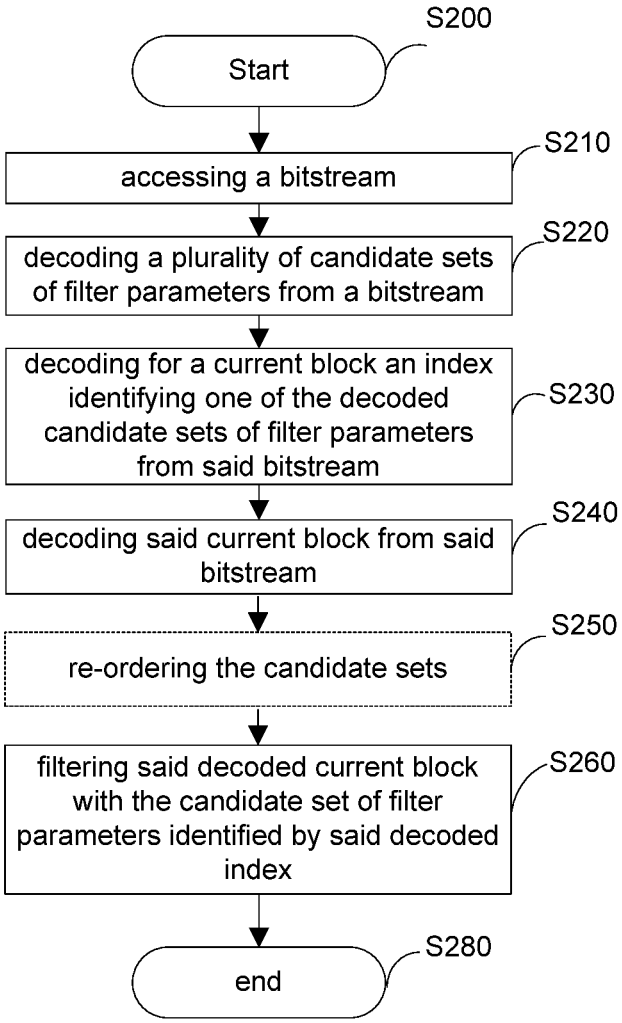
FIG. 13 represents a flowchart of a method for decoding blocks of a picture part from a bitstream according to a specific and non-limiting embodiment.

FIG. 12 illustrates a block diagram of an exemplary video decoder 200, e.g. an HEVC video decoder, adapted to execute the decoding method of FIG. 13. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 2, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information. The transform coefficients are de-quantized (240) and inverse transformed (250) to decode residuals. The decoded residuals are then combined (255) with a predicted sample block (also known as a predictor) to obtain a decoded/reconstructed picture block. The predicted sample block may be obtained (270) from intra prediction (260) or motion-compensated prediction (i.e., inter prediction) (275). As described above, AMVP and merge mode techniques may be used during motion compensation, which may use interpolation filters to calculate interpolated values for sub-integer samples of a reference block. An in-loop filter (265) is applied to the reconstructed picture. The in-loop filter may comprise a deblocking filter and a SAO filter. The filtered picture is stored at a reference picture buffer (280).

FIG. 13 represents a flowchart of a method for decoding blocks of a picture part from a bitstream according to a specific and non-limiting embodiment. The picture part may be the whole picture or a sub-part of it, e.g. a slice.

The method starts at step S200. At step S210, a receiver 2000 such as the decoder 200 accesses a bitstream. At step S220, the receiver decodes a plurality of candidate sets of filter parameters from the bitstream. The plurality of candidate sets are thus ordered according to the order in which they are decoded. With respect to FIG. 7, three candidate sets of filter parameters are decoded (c-0, c-1 and c-2). Each block of the picture part on the right side of FIG. 7 inherits its filter parameters from one of the three candidate sets. On FIG. 7, blocks Blk_0, Blk_1, Blk_4 and Blk_5 have the same filter parameters, i.e. the filter parameters of the candidate set c-0, the blocks Blk_2 and Blk_3 have the same filter parameters, i.e. the filter parameters of the candidate set c-1 and the blocks Blk_6 and Blk_7 have the same filter parameters, i.e. the filter parameters of the candidate set c-2.

In a particular embodiment, a specific candidate set of filter parameters known as the OFF candidate set is added to the list of decoded candidate sets. As an example, the OFF candidate is inserted between the decoded candidate sets at a predefined position, e.g. the second position. The OFF candidate is not decoded from the bitstream. It is used to indicate that a block is not filtered.

Advantageously, the plurality of candidate sets of filter parameters are decoded from a header of a slice. In a variant, the plurality of candidate sets of filter parameters are decoded at the level of the first block (e.g. Blk_0 on FIG. 7) of the picture part in the decoding order. As an example, on FIG. 8, the three candidate sets of filter parameters are encoded with the syntax elements of the first block, Blk_0.

In another embodiment, the receiver decodes from the bitstream a data representative of a number of candidate sets of filter parameters. As an example, the decoded data num_sao_cand_minus1 is the number of candidate sets of filter parameters to be decoded minus1. Since the value of num_sao_cand_minus1 is necessarily inferior to the number of blocks in one picture part, e.g. in one slice, minus one, the number of bits representing the syntax element num_sao_cand_minus1 is inferior to log 2(number of blocks in one picture part minus one).

An example of syntax of the HEVC type for SAO filtering is provided by tables 1 and 2. According to Table 2, once num_sao_cand_minus1 is decoded, each candidate set of SAO parameters is decoded by calling sao_cand(idxCand). In the case where the OFF candidate set is not added to the list of decoded candidate sets, the syntax is modified as illustrated by Table 3. Table 4 illustrates the decoding of a set of SAO parameters according to the present principles.

The following SAO parameters are decoded: slice_sao_luma_flag, slice_sao_chroma_flag, sao_type_idx_luma, sao_type_idx_chroma, sao_offset_abs[cIdx][idxCand][i], sao_offset_sign[cIdx][idxCand][i], sao_band_ position [cIdx][idxCand], sao_eo_class_luma,sao_eo_class_chroma.

At step S230, the receiver decodes for a current block of the picture an index (merge_idx) identifying one of the decoded candidate sets of filter parameters from the bitstream. The decoding of the index merge_idx for a block of coordinate (rx, ry) is illustrated by Table 5 in the case where the OFF candidate set is added to the list of decoded candidate sets or by Table 6 in the case where the OFF candidate set is not added to the list of decoded candidate sets.

With reference to FIG. 8, an index is decoded for each block (merge_idx). This index identifies one of the candidate sets of filter parameters. In an embodiment, all the blocks are in merge mode, i.e. all blocks inherit their filter parameters from one of the candidate sets of filter parameters. This makes it possible to save some bits since there is no more need to decode for a block a flag indicating whether the block is in merge mode or not, i.e. whether or not it inherits its filter parameters from neighbors or not. In particular, there is no more need to decode the following HEVC flags sao_merge_left_flag and sao_merge_up_flag which specify that SAO parameters are derived from corresponding SAO parameters of neighboring CTUs.

In a specific embodiment, the plurality of candidate sets of filter parameters are decoded from the bitstream in the same order as their order of first use. In this case, the largest possible value of index (idx_max) for a given block increases with the block number. More precisely, idx_max is incremented only if the merge index corresponds to a candidate set not yet used by any block previously decoded. As an example, in the case where the index for blk_0 is equal to 0, i.e. blk_0 uses the filter parameters defined in c_0, if the index for blk_1 is also equal to 0, then idx_max is not incremented for blk_2, while if the index for blk_1 is equal to 1, i.e. blk_1 uses the filter parameters defined in c_1 which is a candidate set not yet used, then idx_max is incremented for blk_2.

However, the information whether the value of merge_idx corresponds to a candidate not yet used by previously decoded blocks may be unavailable at the parsing stage.

Therefore, in a variant, the value of idx_max is incremented only if the parsed value of merge_idx is non-zero because the first candidate in the list is necessary a candidate used yet (except for the first block). Truncated Rice (TR) binarization as specified in 9.3.3.2 of HEVC standard, the value of cMax is idx_max.

In a variant, the value idx_max is another increasing function of the number of candidate sets of filter parameters used for filtering blocks decoded prior to the current block.

At step S240, the receiver decodes the current block from the bitstream. Decoding a block usually but not necessarily comprises entropy decoding a portion of the bitstream representative of the block to obtain a block of transform coefficients, de-quantizing and inverse transforming the block of transform coefficients to obtain a block of residuals and adding a predictor to the block of residuals to obtain a decoded block. Possibly, the order of S230 and S240 may be permuted.

At an optional step S250, the candidate sets of filter parameters are re-ordered before the index decoded at step S230 is used to retrieve the set of filter parameters from the list of candidate sets. In a specific embodiment, the candidate sets of filter parameters are re-ordered each time a block of the picture part is decoded. The re-ordering is achieved before the block is filtered.

In a first embodiment, the candidate sets of filter parameters are re-ordered such that the set of filter parameters used for a block located immediately to the left of the current block when such a block is available is put at the first position in the list of candidate sets of filtering parameters.

Figure 14:
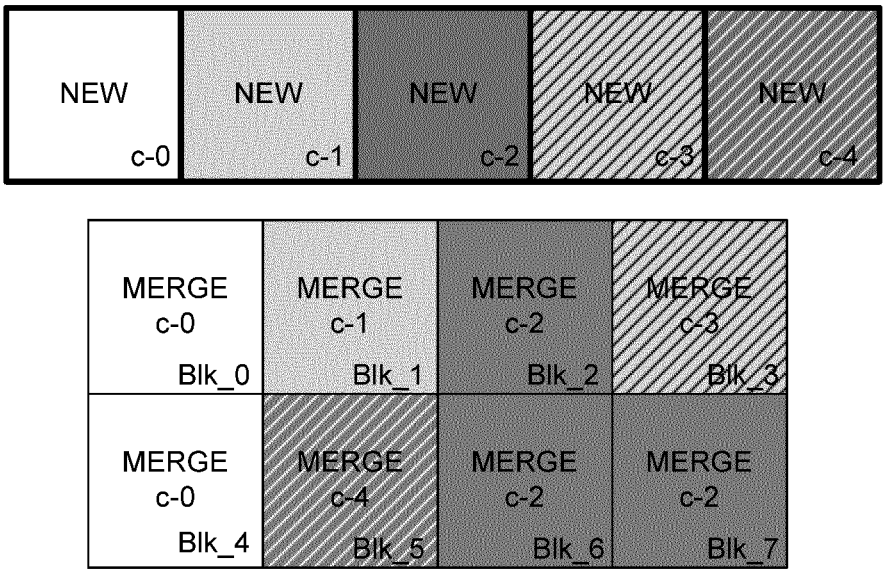
FIG. 14 is a pictorial example illustrating blocks of a picture part referring to a plurality of candidate sets of filter parameters according to the present principles.
Figure 15:
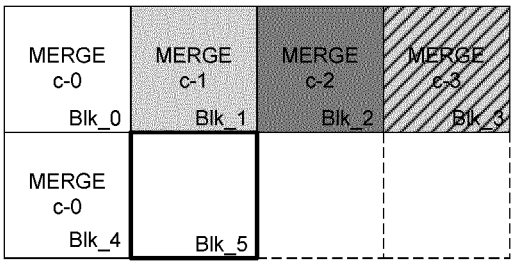
FIG. 15 is another pictorial example illustrating blocks of a picture part referring to a plurality of candidate sets of filter parameters according to the present principles.

In another embodiment, the candidate sets of filter parameters are re-ordered such that the candidate sets of filter parameters that have been used for filtering blocks decoded prior to the current block, referred to as prior blocks, are listed in an order which depends on a spatial distance of this prior block to the current block. In the case where several blocks use the same candidate sets, only the block that is spatially the closest to the current block is taken into account. This can be done by building a map of used candidate sets. An example of dynamically re-ordering the list of candidate sets of filtering parameters is shown in Table 7 in relation to FIG. 14. The candidate sets are re-ordered each time a current block is decoded. In this example, the next not yet used candidate is put at the end of the list. The process of list re-ordering is illustrated with FIG. 15 for decoding a current block Blk_5. When decoding Blk_5, the last used candidate sets are {c_0, c_1, c_2, c_3}. c_0 was used by Blk_0 and Blk_4, c_1 was used by Blk_1, c_2 was used by Blk_2 and c_3 was used by Blk_3. The smaller square Euclidian distance of Blk_5 to the blocks Blk_4, Blk_1, Blk_2, Blk_3 are {1,1,2,5} respectively. For the candidate set c_0, the spatial distance of Blk_4 to Blk_5 is taken into account and not the distance of Blk_0 to Blk_5 because Blk_4 is spatially closer to Blk_5 than Blk_0. When decoding Blk_5, the closest used candidate sets are thus c_0 (left), c_1 (top), c_2 (top-right) and c_3 (top-right-right). The candidate c_4 has not been used yet and thus is put at the end of the list.

TABLE 7

| Blk | Re-ordered list of candidate sets | idx_max | merge_idx |
|---|---|---|---|
| 0 | {0} | 0 | Not coded (inferred to be 0) |
| 1 | {0, 1} | 1 | 1 |
| 2 | {1, 0, 2} | 2 | 2 |
| 3 | {2, 1, 0, 3} | 3 | 3 |
| 4 | {0, 1, 2, 3, 4} | 4 | 0 |
| 5 | {0, 1, 2, 3, 4} | 4 | 4 |
| 6 | {4, 2, 1, 3, 0} | 4 | 1 |
| 7 | {2, 3, 4, 1, 0} | 4 | 0 |

In a variant, at least one candidate set of filter parameters not used for filtering blocks decoded prior to the current block, e.g. the first candidate to be used next, is inserted at a position pos_first_new that is before the position of the last candidate set of filter parameters used for filtering the blocks decoded prior to the current block. The value of pos_first_new is known a-priori at the decoder side. For example, pos_first_new may be set to 2 or may be encoded in the bitstream. This variant is illustrated by Table 8. In this example, the candidate not yet used that is to be used next is put at position 2 (highlighted in italics in Table 5). For Blk_5, candidate c_4 is put at position 2 in the list while in table 4 it was put at the end of the list. In the case where the number of candidate sets used for filtering prior decoded blocks is strictly inferior to pos_first_new, the position of the first candidate set not used for filtering prior decoded blocks may be inserted before pos_first_new. Prior decoded blocks are blocks decoded prior the current block.

TABLE 8

| Blk | Re-ordered list of candidate sets | idx_max | merge_idx |
|---|---|---|---|
| 0 | {0} | 0 | Not coded (inferred to be 0) |
| 1 | {0, 1} | 1 | 1 |
| 2 | {1, 0, 2} | 2 | 2 |
| 3 | {2, 1, 3, 0} | 3 | 2 |
| 4 | {0, 1, 4, 2, 3} | 4 | 0 |
| 5 | {0, 1, 4, 2, 3} | 4 | 2 |
| 6 | {4, 2, 1, 3, 0} | 4 | 1 |
| 7 | {2, 3, 4, 1, 0} | 4 | 0 |

Tables 7 and 8 illustrate the case where the OFF candidate set is not added to the list of decoded candidate sets. In the case where the OFF candidate set is added to the list of decoded candidate sets, the merge_idx is not inferred for the first block but is decoded. In this latter case, the value of idx_max is incremented by 1 in the tables 7 and 8.

In another embodiment, pos_first_new is function of the number of blocks remaining to decode after the current block in the picture part and of the number of candidate sets not yet used for filtering prior decoded blocks. For example, the position pos_first_new is derived from the probability of occurrence of using a new candidate set. For example, the position pos_first_new may be equal to the integer part of P or of P+1, where P=(number of blocks remaining to decode)/(number of candidate sets not yet used).

In another embodiment, a specific candidate set of filter parameters known as the OFF candidate is added to the list of candidate sets but is not decoded. In the case where an index for a block identifies this specific candidate, the corresponding block is not filtered.

In an example, the position pos_off of the OFF candidate is close to the beginning of the list, e.g. first position (pos_off=0) or second/third position (pos_off=1 or pos_off=2) in the list. In a specific embodiment, the position pos_off of the OFF candidate in the list is not modified in case where the list is re-ordered. In a variant, its position is not fixed, i.e. it follows the same re-ordering rules as the other candidate sets with a restriction. The restriction is that the position of the OFF candidate in the list cannot be beyond a fixed position, e.g. the position 2.

At step S260, the receiver filters the decoded current block with the candidate set of filter parameters identified by the decoded index. In the case where the index merge_idx identifies the OFF candidate, the block is not filtered at step S260. In a specific embodiment, the filter is a SAO filter and the filtering steps disclosed with reference to FIG. 3 apply.

The method may loop over steps S230 to S260 in order to decode and filter all blocks in the picture part. In a specific and non-limiting embodiment, all the blocks of the picture part may be decoded before beginning to filter these blocks. In a variant, the filtering of some blocks of the picture part may begin before all the blocks of the picture part are decoded.

The method ends at step S280.

The encoding and decoding method and apparatus according to the present principles are not limited to SAO filtering. The method may be applied to any filter defined by filter parameters that may be applied locally, e.g. at block level.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:

obtaining a list of candidate sets of filter parameters and determining an index for a [block, called] current block[,] of a picture part identifying one of the candidate sets of filter parameters to be used for filtering the current block;

filtering a reconstructed version of the current block with the candidate set of filter parameters of the list of candidate sets of filter parameters identified by the index; and encoding in a bitstream information representative of the candidate set of filter parameters in a first bitstream portion dedicated to a storage of information representative of candidate set of filter parameters, a second bitstream portion representative of the current block of the picture part and a third bitstream portion representative of the index of the current block;

wherein obtaining a candidate set of filter parameters and determining an index for a current block comprises:

determining filter parameters for the current block of the picture part either by selecting a candidate set in the list of candidate sets or by defining a new candidate set of filter parameters and by adding said new candidate set in the list of candidate sets based on a rate distortion cost for the current block; *and* determining for the block of the picture part an index identifying one candidate set, called first candidate set, in said list of candidate sets of filter parameters to be used for filtering the block[;

refining the filter parameters of a second candidate set of the list of candidate sets using the reconstructed version of at least one block whose index identifies the second candidate set; and merging the first candidate set and the second candidate set into a single candidate set in the case where the sum of a first rate distortion cost computed on a first region and of a second rate distortion cost computed on a second region is larger than a rate distortion cost obtained when using a single candidate set whose filter parameters are determined on a region composed of the union of the first and second regions, wherein the first region comprises all the samples of the blocks in the picture part that use the first candidate set and the second region comprises all the samples of the current block in the picture part that use the second candidate set and updating the index of the current block of the picture part in the case where said first and second candidate sets are merged into a single candidate set].

2. The method of claim [1] *17*, wherein the merging the first candidate set and the second candidate set into a single candidate set is repeated for another pair of candidate sets in said list of candidate sets.

3. The method of claim 1, wherein said method further comprises repeating the determining filter parameters for the current block of the picture part for different scanning orders of said blocks in said picture part, a list of candidate sets being determined for each scanning order and determining among the different scanning orders the list of candidate sets associated with a lowest rate distortion cost.

4. The method of claim 1, wherein a candidate set of filter parameters is determined independently for each block of the picture part.

5. The method of claim 1, further comprising selecting one candidate set in the list of candidate sets and removing the selected candidate set from the list of candidate sets in the case where rate-distortion cost is decreased for the picture part by removing the selected candidate set.

6. An encoder comprising electronic circuitry adapted for:

obtaining a list of candidate sets of filter parameters and determining an index for a [block, called] current block[,] of a picture part identifying one of the candidate sets of filter parameters to be used for filtering the current block;

filtering a reconstructed version of the current block with the candidate set of filter parameters of the list of candidate sets of filter parameters identified by the index; and encoding in a bitstream information representative of the candidate set of filter parameters in a first bitstream portion dedicated to a storage of information representative of candidate set of filter parameters, a second bitstream portion representative of the current block of the picture part and a third bitstream portion representative of the index of the current block;

wherein for obtaining a candidate set of filter parameters and determining an index for a current block the electronic circuitry is further adapted for:

determining filter parameters for the current block of the picture part either by selecting a candidate set in the list of candidate sets or by defining a new candidate set of filter parameters and by adding said new candidate set in the list of candidate sets based on a rate distortion cost for the current block; *and* determining for the block of the picture part an index identifying one candidate set, called first candidate set, in said list of candidate sets of filter parameters to be used for filtering the block[;

refining the filter parameters of a second candidate set of the list of candidate sets using the reconstructed version of at least one block whose index identifies the second candidate set; and merging the first candidate set and the second candidate set into a single candidate set in the case where the sum of a first rate distortion cost computed on a first region and of a second rate distortion cost computed on a second region is larger than a rate distortion cost obtained when using a single candidate set whose filter parameters are determined on a region composed of the union of the first and second regions, wherein the first region comprises all the samples of the blocks in the picture part that use the first candidate set and the second region comprises all the samples of the current block in the picture part that use the second candidate set and updating the index of the current block of the picture part in the case where said first and second candidate sets are merged into a single candidate set].

7. The encoder of claim [6] *19*, wherein the electronic circuitry is adapted for repeating the merging the first candidate set and the second candidate set into a single candidate set for another pair of candidate sets in said list of candidate sets.

8. The encoder of claim 6, wherein, for obtaining a list of candidate sets, the electronic circuitry is further configured to repeat the determining filter parameters for the current block of the picture part for different scanning orders of said blocks in said picture part, a list of candidate sets being determined for each scanning order and to determine among the different scanning orders the list of candidate sets associated with a lowest rate distortion cost.

9. The encoder of claim 6, wherein to determine a list of candidate sets of filter parameters comprises to determine a candidate set of filter parameters independently for each block of the picture part.

10. The encoder of claim 6, wherein, for obtaining a list of candidate sets of filter parameters, the electronic circuitry is further configured to select one candidate set in the list of candidate sets and removing the selected candidate set from the list of candidate sets in the case where rate-distortion cost is decreased for the picture part by removing the selected candidate set.

11. A non-transitory machine readable medium having stored thereon machine executable instructions that, when executed, implement a method comprising:

obtaining a list of candidate sets of filter parameters and determining an index for a [block, called] current block[.] of a picture part identifying one of the candidate sets of filter parameters to be used for filtering the current block;

filtering a reconstructed version of the current block with the candidate set of filter parameters of the list of candidate sets of filter parameters identified by the index; and encoding in a bitstream information representative of the candidate set of filter parameters in a first bitstream portion dedicated to a storage of information representative of candidate set of filter parameters, a second bitstream portion representative of the current block of the picture part and a third bitstream portion representative of the index of the current block;

wherein obtaining a candidate set of filter parameters and determining an index for a current block comprises:

determining filter parameters for the current block of the picture part either by selecting a candidate set in the list of candidate sets or by defining a new candidate set of filter parameters and by adding said new candidate set in the list of candidate sets based on a rate distortion cost for the current block; *and* determining for the block of the picture part an index identifying one candidate set, called first candidate set, in said list of candidate sets of filter parameters to be used for filtering the block[;

refining the filter parameters of a second candidate set of the list of candidate sets using the reconstructed version of at least one block whose index identifies the second candidate set; and merging the first candidate set and the second candidate set into a single candidate set in the case where the sum of a first rate distortion cost computed on a first region and of a second rate distortion cost computed on a second region is larger than a rate distortion cost obtained when using a single candidate set whose filter parameters are determined on a region composed of the union of the first and second regions, wherein the first region comprises all the samples of the blocks in the picture part that use the first candidate set and the second region comprises all the samples of the current block in the picture part that use the second candidate set and updating the index of the current block of the picture part in the case where said first and second candidate sets are merged into a single candidate set].

12. The non-transitory machine readable medium of claim [11] *21*, wherein the [determining filter parameters for the current block of the picture part] *merging the first candidate set and the second candidate set into a single candidate set* is repeated for another pair of candidate sets in said list of candidate sets.

13. The non-transitory machine readable medium of claim 11, wherein said method further comprises repeating the determining filter parameters for the current block of the picture part for different scanning orders of said blocks in said picture part, a list of candidate sets being determined for each scanning order and determining among the different scanning orders the list of candidate sets associated with a lowest rate distortion cost.

14. The non-transitory machine readable medium of claim 11, wherein a candidate set of filter parameters is determined independently for each block of the picture part.

15. The non-transitory machine readable medium of claim 11, further comprising selecting one candidate set in the list of candidate sets and removing the selected candidate set from the list of candidate sets in the case where rate-distortion cost is decreased for the picture part by removing the selected candidate set.

*16. The method of claim 1, further comprising refining filter parameters of a second candidate set of the list of candidate sets using a reconstructed version of at least one block whose index identifies the second candidate set.*

*17. The method of claim 16, further comprising merging the first candidate set and the second candidate set into a single candidate set in the case where the sum of a first rate distortion cost computed on a first region and of a second rate distortion cost computed on a second region is larger than a rate distortion cost obtained when using a single candidate set whose filter parameters are determined on a region composed of the union of the first and second regions, wherein the first region comprises all the samples of the blocks in the picture part that use the first candidate and the second region comprises all the samples of the current block in the picture part that use the second candidate set and updating the index of the current block of the picture part in the case where said first and second candidate sets are merged into a single candidate set.*

*18. The encoder of claim 6, wherein the electronic circuitry is adapted for refining filter parameters of a second candidate set of the list of candidate sets using a reconstructed version of at least one block whose index identifies the second candidate set.*

*19. The encoder of claim 18, wherein the electronic circuitry is adapted for merging the first candidate set and the second candidate set into a single candidate set in the case where the sum of a first rate distortion cost computed on a first region and of a second rate distortion cost computed on a second region is larger than a rate distortion cost obtained when using a single candidate set whose filter parameters are determined on a region composed of the union of the first and second regions, wherein the first region comprises all the samples of the blocks in the picture part that use the first candidate set and the second region comprises all the samples of the current block in the picture part that use the second candidate set and updating the index of the current block of the picture part in the case where said first and second candidate sets are merged into a single candidate set.*

*20. The non-transitory machine readable medium of claim 11, wherein said method further comprises refining filter parameters of a second candidate set of the list of candidate sets using a reconstructed version of at least one block whose index identifies the second candidate set.*

*21. The non-transitory machine readable medium of claim 20, wherein said method further comprises merging the first candidate set and the second candidate set into a single candidate set in the case where the sum of a first rate distortion cost computed on a first region and of a second rate distortion cost computed on a second region is larger than a rate distortion cost obtained when using a single candidate set whose filter parameters are determined on a region composed of the union of the first and second regions, wherein the first region comprises all the samples of the blocks in the picture part that use the first candidate set and the second region comprises all the samples of the current block in the picture part that use the second candidate set and updating the index of the current block of the picture part in the case where said first and second candidate sets are merged into a single candidate set.*

* * * * *